(12) United States Patent
Sheffler et al.

(10) Patent No.: US 7,802,945 B2
(45) Date of Patent: Sep. 28, 2010

(54) CUTTING TOOL FOR ROUGH AND FINISH MILLING

(75) Inventors: Glenn W. Sheffler, Blairsville, PA (US); Gregory A. Hyatt, South Barrington, IL (US); Paul D. Prichard, Greensburg, PA (US); Linn R. Andras, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 314 days.

(21) Appl. No.: 11/666,526

(22) PCT Filed: Feb. 26, 2004

(86) PCT No.: PCT/US2004/007688

§ 371 (c)(1),
(2), (4) Date: Mar. 31, 2008

(87) PCT Pub. No.: WO2005/092581

PCT Pub. Date: Oct. 6, 2005

(65) Prior Publication Data

US 2008/0181736 A1  Jul. 31, 2008

Related U.S. Application Data

(63) Continuation-in-part of application No. 10/234,220, filed on Sep. 4, 2002, now Pat. No. 7,125,205.

(51) Int. Cl.
B23B 27/14 (2006.01)
B27G 13/08 (2006.01)

(52) U.S. Cl. .......................... 407/67; 407/30

(58) Field of Classification Search .................. 407/66, 407/67, 32, 34, 30, 33, 29.13; 408/144, 713
See application file for complete search history.

(56) References Cited

U.S. PATENT DOCUMENTS

| 404,940 | A | 6/1889 | Whitney |
| 479,332 | A | 7/1892 | Patten |
| 1,284,092 | A | 11/1918 | Gray |
| 1,643,474 | A | 9/1927 | Simmons |
| 3,792,517 | A | 2/1974 | Gage |

(Continued)

FOREIGN PATENT DOCUMENTS

CH  76 826 A  2/1918

(Continued)

OTHER PUBLICATIONS

"Connecting Rod Production Reinvented"; Shop Solutions Case Histories of Manufacturing Problem Solving; Manufacturing Engineering, Dec. 2002; pp. 47-48.

Primary Examiner—Will Fridie, Jr.
(74) Attorney, Agent, or Firm—Larry R. Meenan, Esq.

(57) ABSTRACT

A milling cutter (10) comprises a cutter body (12) having at least two operational annular rings (13, 14). An outer ring (13) is provided for rough milling and includes a plurality of cutting inserts spaced about the periphery of the cutter body. Positioned radially inward of the outer ring (13) is at least one ring (14) comprises a coating of abrasive material. As a result, a workpiece can be both tough and finish milled by a single milling cutter (10) with the rough cutting inserts (18) and the abrasive material.

20 Claims, 3 Drawing Sheets

U.S. PATENT DOCUMENTS

| | | | |
|---|---|---|---|
| 3,972,161 A * | 8/1976 | Zoiss | 451/541 |
| 4,018,576 A | 4/1977 | Lowder et al. | |
| 4,675,975 A * | 6/1987 | Kucharczyk et al. | 29/566 |
| 4,728,228 A | 3/1988 | Okunishi et al. | |
| 4,789,273 A | 12/1988 | Wiacek et al. | |
| 4,993,891 A * | 2/1991 | Kaminiski et al. | 407/42 |
| 5,285,600 A | 2/1994 | Shepley | |
| 5,492,771 A | 2/1996 | Lowder et al. | |
| 5,511,718 A | 4/1996 | Lowder et al. | |
| 5,667,428 A | 9/1997 | Lunn | |
| 5,711,642 A | 1/1998 | Ball et al. | |
| 5,816,892 A | 10/1998 | Lunn | |
| 5,951,378 A | 9/1999 | Miller et al. | |
| 5,993,297 A | 11/1999 | Hyatt et al. | |
| 6,081,980 A | 7/2000 | Lunn | |
| 6,193,593 B1 | 2/2001 | Miller et al. | |
| 6,224,473 B1 * | 5/2001 | Miller et al. | 451/461 |
| 6,375,692 B1 | 4/2002 | Manwiller et al. | |
| 6,672,943 B2 * | 1/2004 | Vogtmann et al. | 451/41 |
| 6,926,583 B2 * | 8/2005 | Nussbaumer et al. | 451/5 |
| 7,125,205 B2 * | 10/2006 | Sheffler | 407/11 |
| 2008/0310929 A1 | 12/2008 | Kammermeier et al. | |

FOREIGN PATENT DOCUMENTS

| | | |
|---|---|---|
| DE | 487 142 C | 11/1929 |
| DE | 39 36 243 A1 | 5/1991 |
| EP | 0 398 467 A2 | 11/1990 |
| EP | 0978354 A | 2/2000 |
| FR | 661 531 A | 7/1929 |
| FR | 36 222 E | 4/1930 |
| JP | 52-69086 A | 8/1977 |
| JP | 7-171734 A | 7/1995 |
| JP | 9-29529 A | 2/1997 |
| JP | 10-128673 | 5/1998 |
| JP | 2001-198719 A | 7/2001 |

* cited by examiner

CUTTING TOOL FOR ROUGH AND FINISH MILLING

CROSS REFERENCE TO RELATED APPLICATIONS

This application is a Continuation-In-Part of U.S. application Ser. No. 10/234,220 filed Sep. 4, 2002, now U.S. Pat. No. 7,125,205 entitled "Cutting Tool for Rough and Finish Milling," the entire contents of which are incorporated herein by reference.

FIELD OF THE INVENTION

This invention generally relates to cutting tools. More particularly, this invention relates to a single milling cutter capable of performing both rough and finish milling operations.

BACKGROUND OF THE INVENTION

Milling cutters for rough milling operations are well known. Such milling cutters typically comprise a cutter body, which is a generally circular shaped ring, having a plurality of pockets in an outer periphery thereof. A cutting insert is secured in each pocket. Each cutting insert comprises a body and at least one cutting edge. The body is secured directly in the pocket or to an adjustable insert assembly, which is secured in the pocket. Similar milling cutters are known for finish milling operations. Such milling cutters have an abrasive material thereon, instead of having cutting inserts secured thereto. For milling a workpiece, the two milling cutters are used successively. After milling the workpiece with a rough milling cutter, the rough milling cutter is replaced with the finish milling cutter. Replacing the rough milling cutter with the finish milling cutter is a burdensome, time-consuming task.

What is needed is a single milling tool that is capable of rough and finish milling during a single operation. Ideally, such a tool would include a cutter body having a plurality of cutting inserts releasably secured to an outer periphery thereof for rough milling purposes and an abrasive material, like diamond or cubic boron nitride (CBN), secured to a face thereof for finish milling purposes. By placing the abrasive material deeper into the workpiece from the cutter body than the cutting inserts, rough and finish milling operations can be accomplished during a single milling operation.

SUMMARY OF THE INVENTION

Generally speaking, the invention is directed to a cutting tool for rough and finish milling. The cutting tool is in the form of a milling cutter including a cutter body comprising at least two concentric annular rings. An outer ring is provided for rough milling and includes a plurality of cutting inserts spaced about the periphery of the cutter body. The cutting inserts may or may not be equally spaced about the periphery of the cutter body. An inner finishing ring is comprised of an abrasive material. This material can be diamond, cubic boron nitride (CBN), or any other type of suitable abrasive material. As a result, a workpiece can be rough and finish milled with one or more passes by a single milling cutter.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
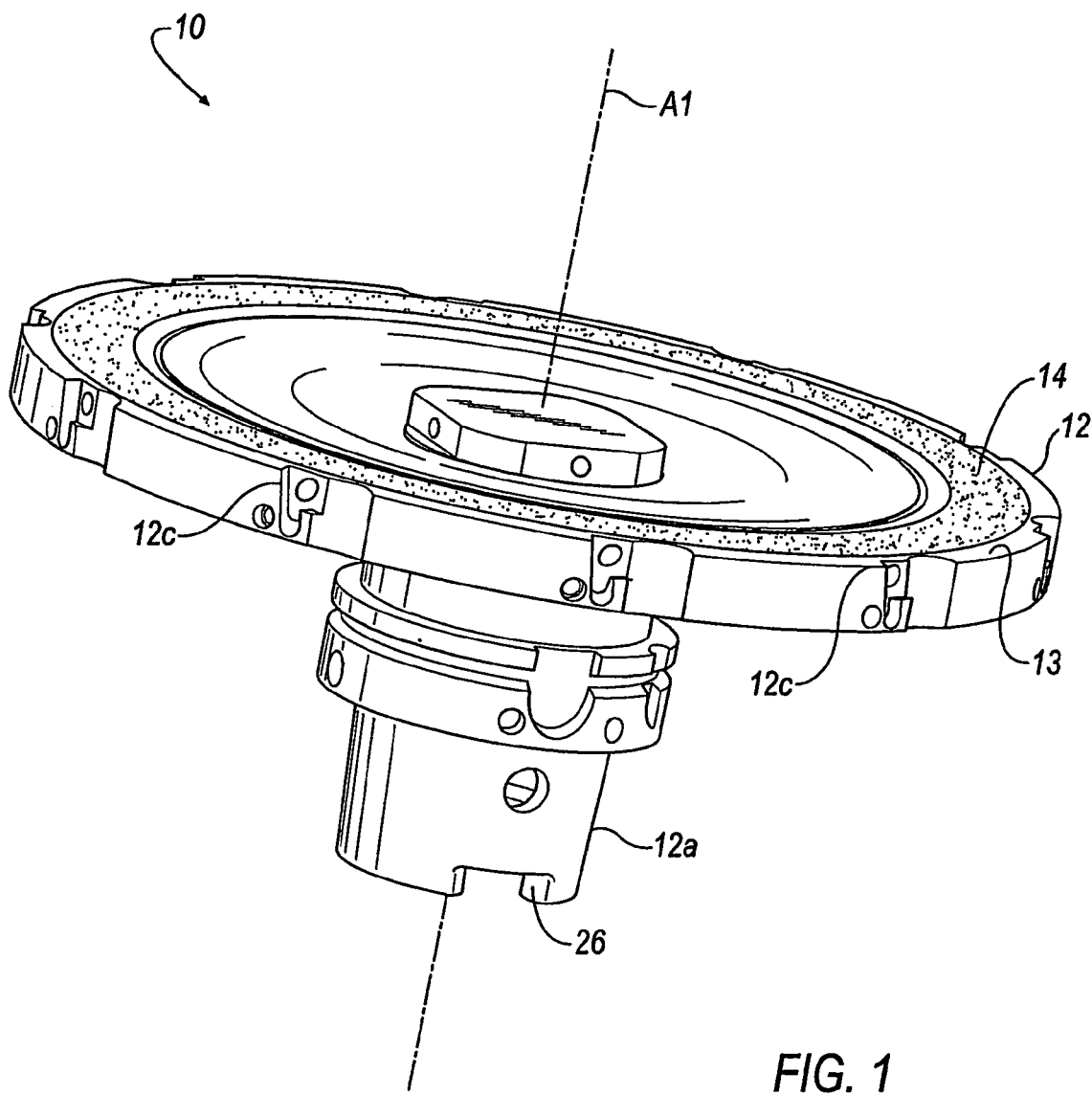
FIG. 1 is a perspective view of a cutting tool of the invention that includes a cutter body without cutting inserts and a finishing ring.

With reference now to FIG. 1, wherein like numerals designate like components throughout all of the several figures, there is illustrated a cutting tool according to a preferred embodiment of the invention. The cutting tool illustrated is in the form of a milling cutter 10 that functions to perform both a rough milling operation and a finish milling operation. The operation may be performed in a single pass or in two or more passes. For example, the milling cutter 10 may first perform a rough milling operation on a work piece in an initial pass and then in one or more subsequent passes perform a finish milling operation on a work piece.

The milling cutter 10 includes a cutter body 12 having at least two concentric annular operational rings 13, 14. An outer ring 13, which is defined by the outer periphery of the cutter body 12, is provided for the rough milling operation. An inner ring, which is defined as a finishing ring 14, is provided for the finish milling operation. It will be appreciated that the cutter body 12 may include additional inner rings 14 as desired.

The cutter body 12 has a central rearward tubular shank 12a in which the end of a rotatable shaft, shaft adapter, or spindle of a milling machine (not shown) can be fitted. The tubular shank 12a is preferably mechanically attached to the tool. However, it is also contemplated that the tubular shank 12a and the tool may be machined from a single piece of steel. The tubular shank 12a has a frustoconical shape and is perforated at two circumferentially spaced locations. Axially aligned with the perforations are slots 26 on the end of the tubular shank 12a. These slots 26 are designed to serve as keyways to accept keys in the spindle to assist in transmitting torque from the milling machine to the milling cutter 10. It should be understood, however, that the present invention is not limited to the tubular shank design shown in FIG. 1, but includes by way of example and not limitation other connection means for connecting the tool to a rotating spindle.

The outer ring 13 of the cutter body 12 includes a plurality of pockets 12c successively defined on the outer peripheral surface of the cutter body. Each of the pockets 12c is of a prescribed dimension to receive a cutting insert 18.

The cutting inserts 18, for example, of high-speed steel, powder metal, carbides or ceramics, are held respectively within the pockets 12c. Each cutting insert 18 is comprised of a body 18a and one or more cutting edges 18b. The cutting edges can be tipped, for example, with polycrystalline diamond (PCD), polycrystalline cubic boron nitride (PCBN), or some other material suitable for removing material from a workpiece. The cutting insert body 18a also has a hole 18c in the radial direction of the cutter body 12 to receive a fastener to secure the cutting inserts in fixed relation to the pockets 12c. This can be accomplished in any suitable manner well known in the art. For example, a clamp stud 20 extends through the hole 18c the cutting insert body 18a and further into a hole (not shown) in the cutter body 12. A clamp stud screw 22 is threaded into a threaded hole 12d in the cutter body 12 at an angle relative to the clamp stud 20 and into engagement with the clamp stud 20 to hold the clamp stud 20 and the cutting insert 18 in the pocket 12c.

The cutting inserts 18 are preferably adjustable relative to the cutter body 12. This can be accomplished in any suitable manner.

Figure 2:
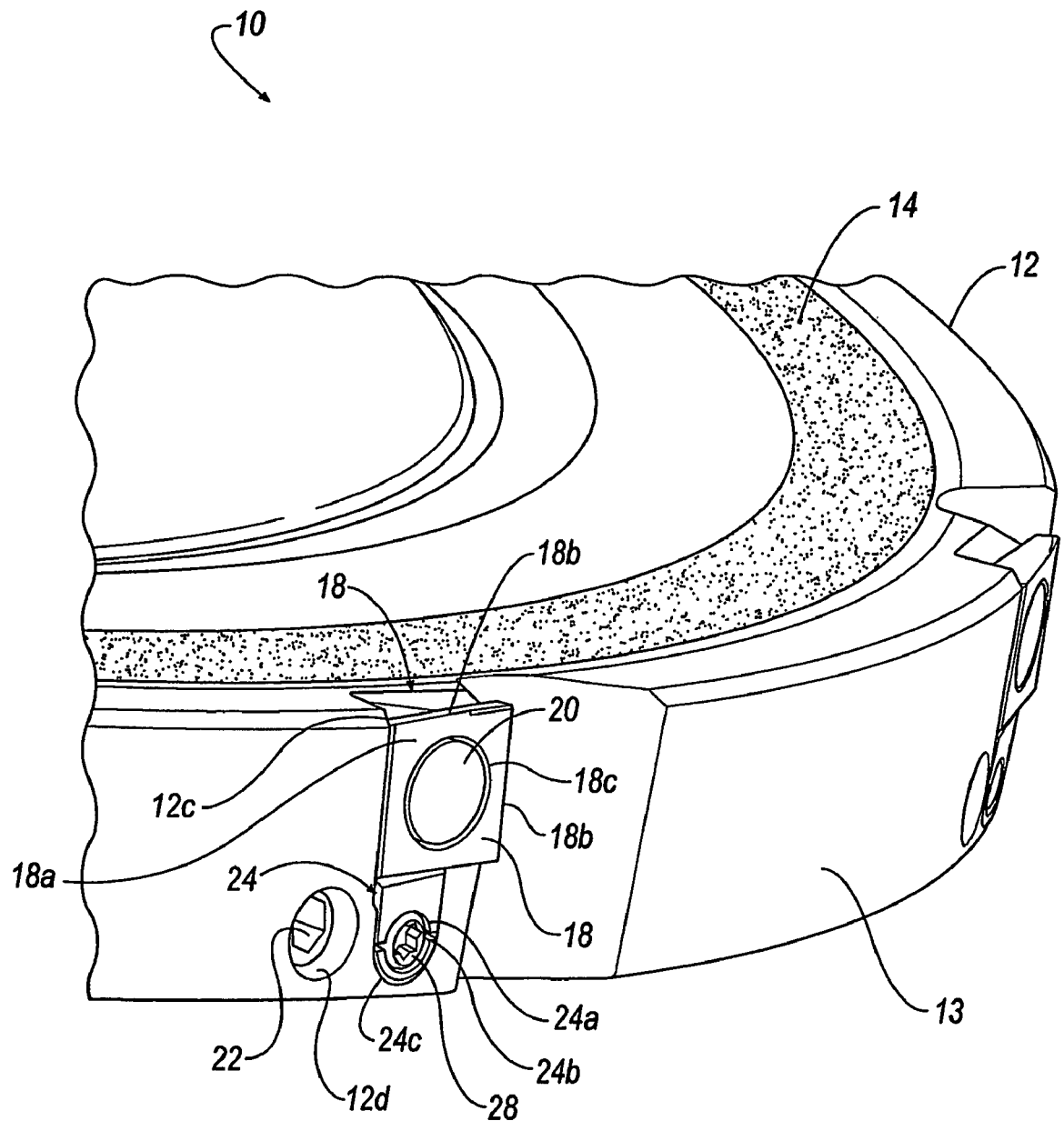
FIG. 2 is an enlarged partial cutaway view in perspective of the cutter body illustrated in FIG. 1 including cutting inserts forming an outer ring.

For example, adjustment elements 24 can be supported about the periphery of the cutter body 12, as illustrated in FIG. 2. Each adjustment element 24 can be supported relative to the cutter body 12 by a retaining element that can be inserted in an axial direction relative to the cutter body 12 into a retaining element slot in the cutter body 12 and further into a retaining element hole in the adjustment element 24. The retaining element functions to hold the adjustment element 24 in place against the centrifugal forces of milling cutter 10 when performing a milling operation. Suitable adjustment elements are commercially available from Kennametal Inc. as Assembly Part Nos. 479.116 and 479.100.

The adjustment element 24 has a tapered hole 24a and a slot 24b extending from the tapered hole 24a to an edge 24c of the adjustment element 24. A tapered screw 28 is threaded into a portion (not shown) of the adjustment element 24. Upon tightening the tapered screw 28 into the tapered hole 24a, the slot 24b in the adjustment element 24 expands, moving the cutting insert 18 in an axial direction.

The finishing ring 14 includes a ring of abrasive material applied on a first side or face 12f of the cutter body 12. The finishing ring 14 comprises at least one abrasive surface, such as an abrasive surface made, for example, of aluminum oxide, diamond, cubic boron nitride (CBN), or other suitable abrasive material. The abrasive material forming the abrasive surface may be arranged randomly, in a defined pattern, as a single piece or formed of multiple discrete portions. The abrasive material forming the abrasive surface may be applied to the cutter body by electroplating, brazing, gluing, or by other means well known in the art. For example, the abrasive may be placed on the face of the cutter body, and a metal is electroplated onto the face, successive layers being plated until the abrasive is fixed to the face of the cutter body.

In an alternate embodiment, the abrasive surface may be bonded to a mesh material that is affixed to the cutter body 12. For a more detailed discussion of a suitable abrasive surface reference is made to U.S. Pat. Nos. 6,478,831; 5,049,165; 5,190,568; 5,203,880; 5,380,390; 5,791,330; 5,980,678; 5,092,910 and 4,925,457, incorporated herein by reference.

Figure 3:
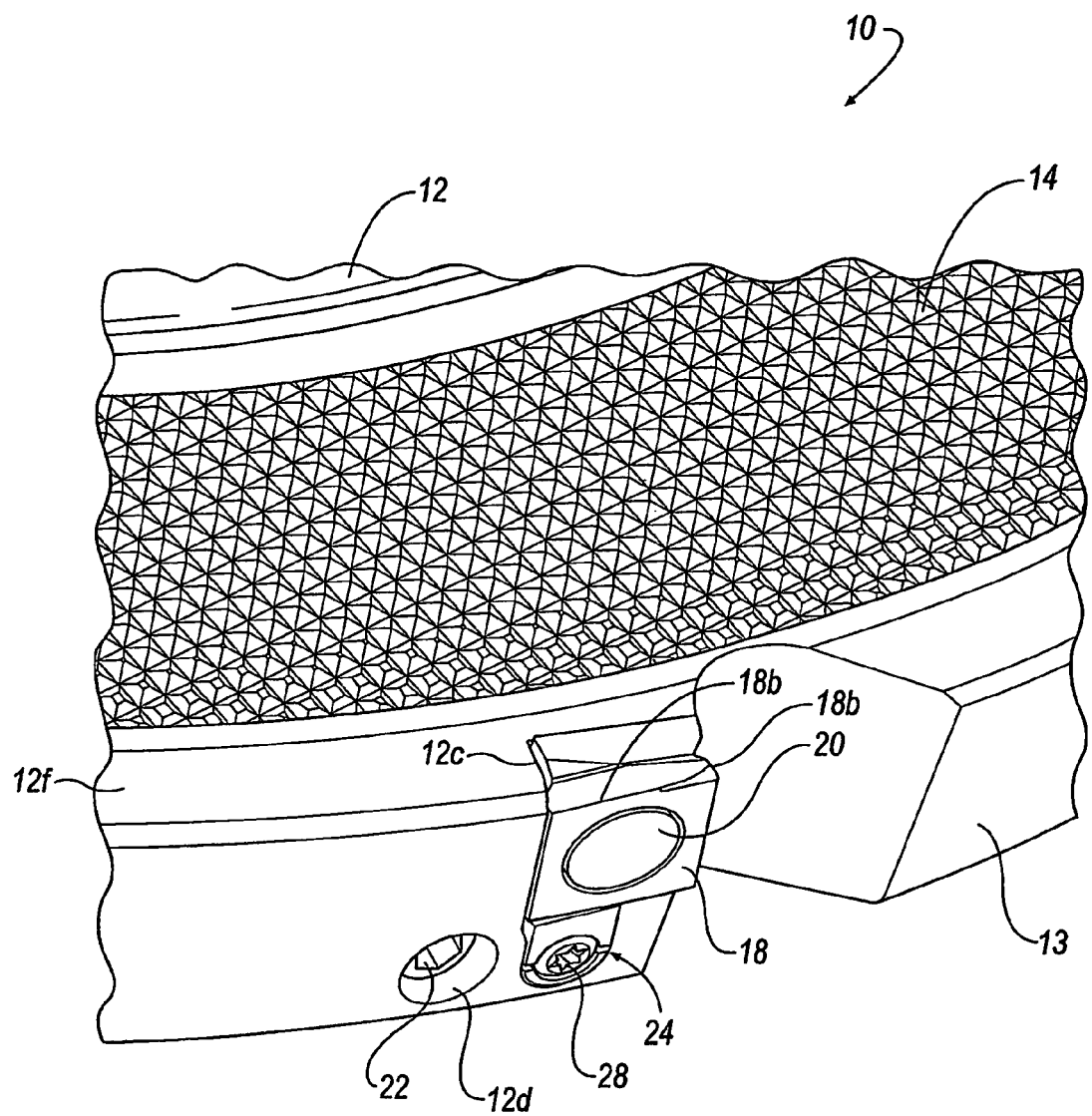
FIG. 3 is a perspective view of a cutting tool having a patterned abrasive surface finishing ring.

The abrasive surface may be formed as a random array of particles, e.g. FIG. 1, or the abrasive surface may be applied as a uniform pattern of particles, e.g., FIG. 3.

When the spindle is rotated at a high speed by a rotatable drive source (not shown), the cutter body 12 is rotated. As the milling cutter 10 traverses a workpiece (not shown), the cutting edges 18b of the inserts 18 mounted on the cutter body 12 cut the workpiece while the abrasive surface of the finishing ring 14 finishes the workpiece.

The cutting edges 18b of the cutting inserts 18 may become worn or damaged, or may require replacement to meet a particular need. The cutting edges 18b can easily be changed simply by indexing the cutting insert to another cutting edge or by replacing the inserts 18 entirely. The cutting inserts 18 can easily be moved and the position of the cutting edges 18b can easily be adjusted relative to the cutter body 12 simply by adjusting the position of the adjustment element 24.

The finishing ring 14 of the milling cutter functions to grind the workpiece. As stated above, the abrasive surface can be diamond, cubic boron nitride (CBN), or any other type of finishing media. The preferred finishing ring 14 does not contain any type of replaceable insert. When the abrasive surface is worn, the finishing ring of the cutter body is resurfaced with new abrasive as previously described.

When the milling cutter 10 is used, the finishing ring 14 projects axially from the cutter body 12 slightly farther than do the cutting inserts 18. The milling cutter 10 can perform both rough and finish milling during a single operation or pass or can perform either rough milling and then finish milling during multiple operations or passes. By adjusting the position of the cutting inserts 18 axially relative to the cutter body 12, the amount of work performed by the finishing ring 14 is adjusted. As the axial distance between the cutting edges 18b of the cutting inserts 18 is increased, the amount of material removed from the workpiece by the finishing ring 14 is increased. It should be clearly understood by one of ordinary skill in the art of the invention that the finishing ring is intended to remove a minimal amount of material to provide a smooth finish work piece surface.

While this invention has been described with respect to several preferred embodiments, various modifications and additions will become apparent to persons of ordinary skill in the art All such variations, modifications, and variations are intended to be encompassed within the scope of this patent, which is limited only by the claims appended hereto.

What is claimed is:

1. A milling cutter comprising:
   a cutter body having at least two annular operational rings formed thereon, the at least two operational rings including an outer ring formed about the periphery of the cutter body and at least one inner ring radially inward of the outer ring,
   wherein the outer ring has at least one insert pocket and a cutting insert secured in the insert pocket and the at least one inner ring has a continuous abrasive surface thereon;
   an adjustment element supported relative to the cutter body and adjustable in an axial direction relative to the cutter body to move the cutting insert in an axial direction relative to the cutter body.

2. The milling cutter of claim 1, wherein the cutter body has a plurality of insert pockets about the periphery including the at least one insert pocket and a cutting insert is secured in each of the insert pockets.

3. The milling cutter of claim 1, wherein the inner ring is concentric with the periphery of the cutter body.

4. The milling cutter of claim 1, wherein the cutting insert performs a rough milling operation and the abrasive material performs a finish milling operation.

5. The milling cutter of claim 1, wherein the cutting insert has a cutting edge tipped with a material suitable for removing material from a workpiece.

6. The milling cutter of claim 1, wherein the cutting insert is adjustable relative to the cutter body.

7. The milling cutter of claim 1, wherein the adjustment element has a tapered hole and a slot extending from the tapered hole to an edge of the adjustment element, the tapered screw being adapted to be tightening into the tapered hole to expand the slot and the adjustment element to move the cutting insert in an axial direction.

8. The milling cutter of claim 1, wherein the abrasive surface is formed of an abrasive material comprising aluminum oxide.

9. The milling cutter of claim 1, wherein the abrasive surface is formed of an abrasive material comprising diamond.

10. The milling cutter of claim 1, wherein the abrasive surface is formed of an abrasive material comprising cubic boron nitride.

11. The milling cutter of claim 1, wherein the abrasive surface is formed of a randomly arranged abrasive material.

12. The milling cutter of claim 1, wherein the abrasive surface is formed of an abrasive material arranged in a pattern.

13. The milling cutter of claim 1, wherein the abrasive surface is formed of an abrasive material bonded to a mesh material that is affixed to the cutter body.

14. The milling cutter of claim 1, wherein the abrasive surface is electroplated to the cutter body.

15. The milling cutter of claim 1, wherein the abrasive surface is formed as a single piece.

16. The milling cutter of claim 1, wherein the abrasive surface is formed of multiple discrete portions.

17. The milling cutter of claim 1, wherein the cutting insert is a ceramic cutting insert.

18. The milling cutter of claim 1, wherein the cutting insert is a cemented carbide cutting insert.

19. The milling cutter of claim 1, wherein the cutting insert is a PCD tipped cutting insert.

20. The milling cutter of claim 1, wherein the cutting insert is a PCBN tipped cutting insert.

* * * * *